Dec. 12, 1972   E. D. BOUTWELL ET AL   3,706,031
TEST CIRCUIT FOR EXPLODING BRIDGEWIRE POWER SUPPLY
Filed April 5, 1971

Ernest D. Boutwell
Jack M. Longfellow,
INVENTORS.

United States Patent Office 3,706,031
Patented Dec. 12, 1972

3,706,031
TEST CIRCUIT FOR EXPLODING BRIDGEWIRE POWER SUPPLY
Ernest D. Boutwell, Winston-Salem, N.C., and Jack M. Longfellow, Orlando, Fla., assignors to the United States of America as represented by the Secretary of the Army
Filed Apr. 5, 1971, Ser. No. 131,314
Int. Cl. G01r *13/36;* H01h *85/30*
U.S. Cl. 324—122
6 Claims

ABSTRACT OF THE DISCLOSURE

A test circuit for determining if an output pulse from an exploding bridgewire power source has sufficient voltage and energy to fire a bridgewire. A gas filled tube such as a cold-cathode trigger and regulating tube in series with a fusible test link simulates an exploding bridgewire with a series spark gap. If a pulse from the power source is of sufficient voltage and energy, the tube conducts, and the test link fuses. If the pulse has sufficient voltage to make the tube conduct but has insufficient energy, the test link will not fuse. Indicators are lit depending on whether the tube conducts and the test link fuses. In the event that the pulse does not fuse the test link, the link is automatically fused by the test circuit, to prevent reuse of the link.

BACKGROUND OF THE INVENTION

This invention is in the field of test circuits for exploding bridgewire power supplies. Known circuits measure either voltage or energy of such supplies, but require two tests for measuring both. These circuits usually do not provide true load conditions for the power supplies, especially for those supplies designed to fire an exploding bridgewire having a series gap. The instant invention tests for both voltage and power of the power supplies, and presents a load to the supplies similar to an exploding bridgewire with a series gap normally fired by such supplies.

SUMMARY OF THE INVENTION

This invention is a circuit for testing exploding bridgewire power supplies and for indicating if the supplies have sufficient voltage and energy to fire a bridgewire with a series gap. The output pulses from the supplies are applied to the series connection of a cold-cathode trigger and regulator tube and a fusible link. If the pulses have sufficient voltage and energy, the tube conducts, and the link is fused. For pulses of insufficient energy but proper voltage, the tube conducts, but the link does not fuse. Proper indications are given for each case. If the pulses do not fuse the test link, the link is automatically fused by the test circuit, to prevent reuse of the link.

DESCRIPTION OF THE PREFERRED EMBODIMENTS

Figure 1:
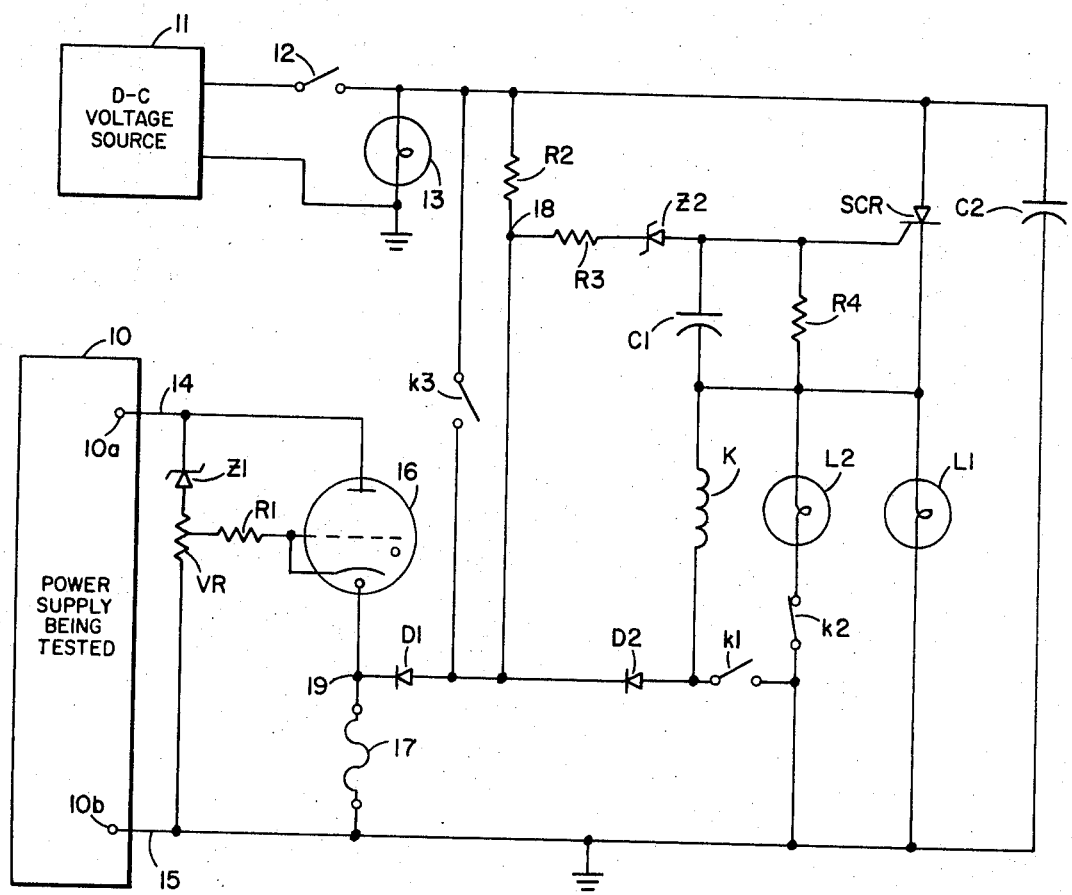
FIG. 1 is a schematic diagram of the inventive test circuit.

The invention may be best understood by referring to the drawings in which FIG. 1 shows power supply 10 being tested by the inventive test circuit. The test circuit requires a D-C voltage source 11. The test circuit may be energized from this source by switch 12. Pilot light 13 lights whenever switch 12 is closed. Power supply 10 has terminals 10a and 10b connected to test circuit lines 14 and 15. As can be seen, line 15 is the ground for the test circuit. Line 14 is connected to the plate of cold-cathode trigger and regulator tube 16. The cathode of the tube is connected through test link 17 to circuit ground. Zener diode Z1 and potentiometer VR are connected in series from lead 14 to lead 15 (ground), with the slider of VR connected through resistor R1 to the grid of tube 16. Potentiometer VR may be varied to determine the voltage at which the tube conducts. If the pulses from power supply 10 have sufficient voltage, tube 16 conducts. If the pulses are of sufficient energy, link 17 fuses. When switch 12 is closed, before a pulse is supplied by power supply 10, a trickle current flows from source 11 to ground through resistor R2, diode D1, and test link 17. This current will establish a voltage at junction 18 of resistors R2 and R3. This voltage will be insufficient to cause Zener diode 22 to break down. Since link 17 has a finite resistance, there will be a small voltage drop across it from the trickle current. When tube 16 conducts, the voltage at point 19 will rise above the voltage established by the trickle current, and diode D1 will be reversed-biased. When D1 is so biased, the current in the path including R2 and D1 will cease, and point 18 will suddenly go to the full voltage value of source 11. What happens next depends on whether or not link 17 fuses. If the energy in the pulse from 10 is insufficient, the link will remain intact, and the potential at point 19 will drop with the cessation of the pulse. The momentary voltage rise at point 18 will break down Zener diode Z2 and allow current to flow through R3 to charge capacitor C1 through a path to ground including relay coil K, diodes D2 and D1, and link 17. The potential at the trigger input of the SCR will rise until the SCR conducts. With the SCR conducting, indicator lights L1 and L2 are lit, and relay K will be energized through diodes D2, D1, and link 17. Obviously the current through K during the charging of C1 is insufficient to operate K. When K is operated, its contacts, k1, k2, and k3, change from the normal positions shown on the drawing. Contact k1 will close and provide a holding path for the relay. Contact k2 will open and turn-off light L2. Contact k3 will close and allow the full voltage from 11 to be applied to link 17 through diode D1. Sufficient current will then flow through 17 to fuse it. An operator may readily determine that the pulses from 10 are not acceptable by observing that only light L1 remains lit.

If link 17 were fused by the pulse from supply 10, the voltage at 18 would rise to the output potential of source 11, and would remain at that potential. Capacitor C1 would not be charged, since there would be no ground through link 17. The SCR, therefore, would be immediately turned on. Both lights L1 and L2 would be energized and would remain so until switch 12 were opened, since relay K would not operate to open contact k2. With both lights on, the operator would be aware that the output pulses from 10 were acceptable. The test is terminated by opening switch 12.

Resistor R4 is a relatively high resistance that bleeds off any charge on C1 after switch 12 is opened. Capacitor C2 acts as a filter to prevent inadverdent operation of the SCR.

Figure 2:
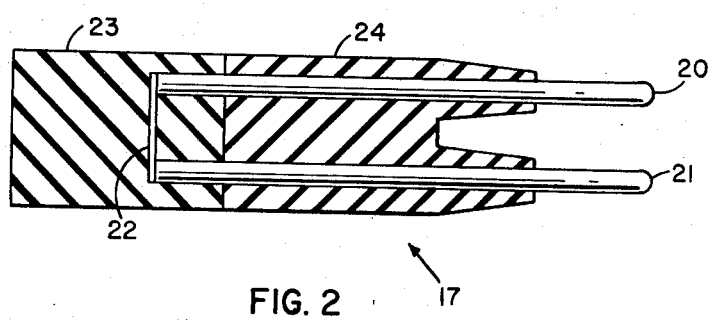
FIG. 2 is a cross-section of a test link useable with the FIG. 1 circuit.

A test link usable with the invention is that shown in FIG. 2. This link includes connecting pins 20 and 21, a fusible portion 22, and insulators 23 and 24. Insulator 23, which may be hard rubber, surrounds and protects portion 22. Insulator 24, which may be soft rubber, surrounds and supports pins 20 and 21. Fusible portion 22 is chosen according to the particular power supplies being tested.

A particular example of tube 16 is the KN–6 made by Eddgerton, Gemeshausen, and Grier and known by the trade name Krytron.

We claim:
1. A tester for an exploding bridgewire power supply including: a gaseous discharge tube connected in series with a fusible link across said supply, with one side of said supply connected to a circuit common; and sensing means connected across the connection of said tube and said link and said common; wherein said sensing means includes: a D-C voltage source having a first terminal connected to said circuit common and having a second terminal connected to one side of a switch; a SCR having its anode connected to the other side of said switch; two indicators connected between the cathode of said SCR and circuit common; trigger circuit means having respective connections to said other side of said switch to the trigger input of said SCR and to said connection of said tube and said link.

2. A tester as set forth in claim 1 wherein said gaseous discharge tube is a cold-cathode trigger tube.

3. The tester as set forth in claim 1 wherein said trigger circuit means includes a first resistor and a first diode connected in series between said other side of said switch and connection of said tube and said link; and a second resistor and a first backward connected Zener diode connected between the connection of said first resistor and said first diode and the trigger input of said SCR.

4. The tester as set forth in claim 3 further including a relay having a coil and having plural contacts with one side of said coil connected to the cathode of said SCR and the other side of said coil connected to the connection of said first diode and said first resistor by a second diode; a normally closed contact of said relay in series with one of said indicators and circuit common; a normally opened contact of said relay connected between the other side of said relay and circuit common; and another normally opened contact of said relay connected between said other side of said switch and the connection of said first diode and said first resistor.

5. The tester as set forth in claim 4 further including the parallel connection of a capacitor and a resistor connected between said trigger input of said SCR and said first side of said relay coils.

6. The tester as set forth in claim 5 further including a series connection of a second backward Zener diode and a tapped variable resistor connected between the plate of said tube and circuit common, and a third resistor connected between the tap of said variable resistor and the grid of said tube.

References Cited
UNITED STATES PATENTS

| | | | |
|---|---|---|---|
| 3,513,393 | 5/1970 | Myers | 324—122 X |
| 3,571,707 | 3/1971 | Houck | 324—133 X |
| 2,450,153 | 9/1948 | Moore | 324—122 |

RUDOLPH V. ROLINEC, Primary Examiner

E. F. KARLSEN, Assistant Examiner

U.S. Cl. X.R.

337—241; 340—252 R